J. J. CLARK & H. SPLITDORF.
SOUNDER MAGNET.
No. 49,857. Patented Sept. 12, 1865.
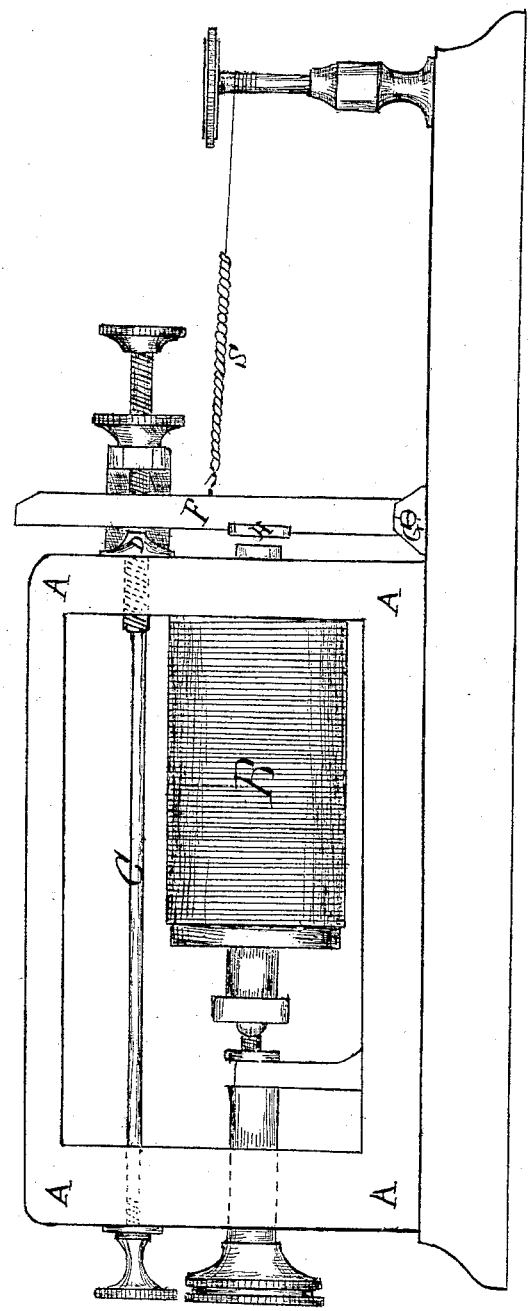
Witnesses
Emanuel Rauch
John Brown
Henry Splitdorf
James J. Clark

UNITED STATES PATENT OFFICE.

JAMES J. CLARK AND HENRY SPLITDORF, OF NEW YORK, N. Y.

IMPROVEMENT IN SOUNDER-MAGNETS.

Specification forming part of Letters Patent No. 49,857, dated September 12, 1865.

*To all whom it may concern:*

Be it known that we, JAMES J. CLARK, of the city and county of New York, and State of New York, and HENRY SPLITDORF, of the same place, have invented a new and useful Improvement in Telegraph Receiving-Magnets; and we do declare the following to be a full, clear, and exact description thereof, reference being had to the accompanying drawing, and the letters of reference marked thereon.

The drawing represents a side view of our improved magnet.

Our improvement consists in a device by which greater sound and a more distinct tone is produced by the action of the lever of a receiving-magnet than has heretofore been produced, thus enabling the operator to read more readily by the sound from this instrument than has heretofore been the case.

In the drawing, A A A A represent a box with its side open, so as to show the parts within; B, the magnet; C, a metallic rod attached to the anvil D, and having a small thumb-nut, E, at its other end; F, the lever, centered at G and having H attached. S is the reacting-spring.

The action of our improvement is as follows: When the lever F is drawn up by the action of the magnet and strikes the anvil D the blow is communicated to the back of the box as well as the front by the rod C, and the back and front of the box being put in a high state of tension by the nut E having been screwed firmly up, a sharp and distinct sound is produced, which is better to read by than that produced when the rod C is not there and the box not put in a high state of tension.

The rod C may be of other substance than metal; but we prefer metal for the purpose.

The nut E may be placed inside instead of outside the box, and so produce a tension and close union of the back and front of the box by screwing the nut up firmly and pressing the two sides from each other; but we prefer it placed as indicated in the drawing.

The box may be of a different form and placed in another part of the instrument; but this form of box is convenient and protects the coils of the magnet from damage.

The box may be open at the top or sides, if preferred in that way; but our device is confined to the rod C and its action in producing a high tension in the back and front of the box and connecting them together, so that a blow on one side will be communicated to the other.

Having described our invention, what we claim, and desire to secure by Letters Patent of the United States, is—

The rod C or its equivalent, in combination with the anvil D, arranged in the manner and for the purposes as hereinbefore specified.

HENRY SPLITDORF.
JAMES J. CLARK.

Witnesses:
EMANUEL RANCH,
JOHN BROWN.